United States Patent Office 3,229,438
Patented Jan. 18, 1966

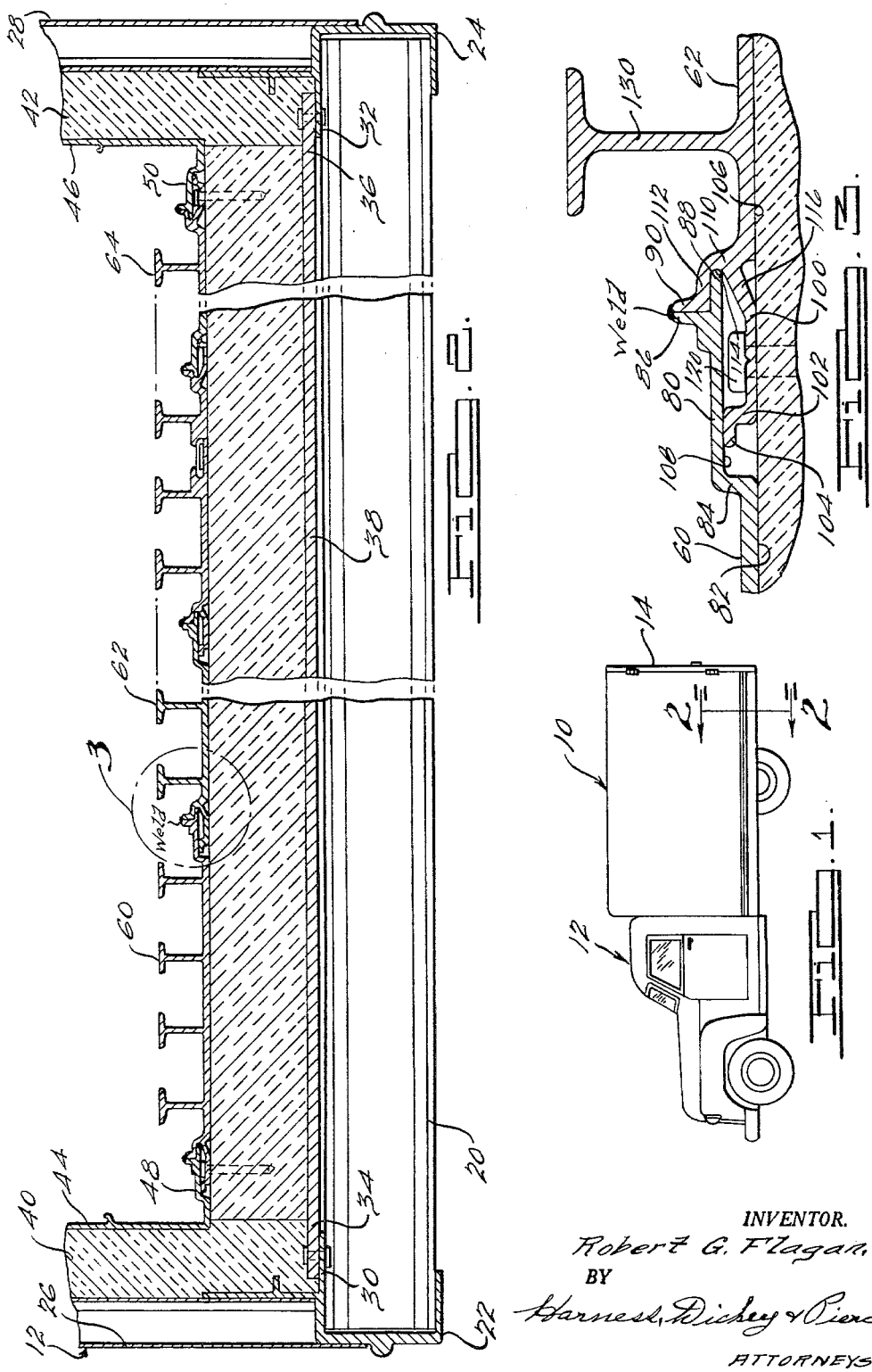

3,229,438
FLOOR CONSTRUCTION FOR TRUCKS, TRAILERS AND THE LIKE
Robert G. Flagan, Grosse Pointe Park, Mich., assignor to Fruehauf Corporation, a corporation of Michigan
Filed July 31, 1961, Ser. No. 128,138
1 Claim. (Cl. 52—588)

This invention relates generally to a floor construction for trucks, trailers and the like and more specifically to a novel planking construction that facilitates welding of adjacent planks to one another.

It is often required that the members or planks forming, for example, the floor of a truck or a trailer body, be welded to one another to substantially seal the enclosure. Water leakage, insect infestation, and the infiltration of odors and air at ambient temperatures to and from the enclosure are thus precluded.

The present invention is directed to a floor construction that facilitates welding of adajcent planks to form the floor. Abutting portions of the planks form weld tips of optimum dimension and orientation that provide for efficient welding of the adjacent planks to one another. The cross-sectional configuration of the floor panels is such that the weld tips supply the weld metal necessary to form the weld, thus requiring no filler metal, wire or rod. Also, this cross-sectional configuration of the panels facilitates welding thereof by a high-speed mechanized welding process. The welded portions of adjacent planks are rigidly supported in a manner that precludes cracking of the weld. Also, the floor planks are secured to other structural members of the body by a holding means that does not extend through the sealed inner surface of the body enclosure.

Accordingly, one object of the instant invention is an improved floor construction for trucks, trailers and the like.

Another object is a floor construction comprising aluminum planks having a cross-sectional configuration forming weld tips of optimum dimension and orientation thereby to eleminate the requirement for filler material.

Another object is a floor construction comprising a plurality of welded extruded aluminum planks.

Another object of the instant invention is an extruded floor construction for trucks, trailers and the like, wherein the floor panels or boards are secured to an underlying construction by a holding means that does not extend interiorly of the enclosure.

Other objects and advantages of the instant invention will be apparent from the following specification, claim and drawings wherein:

FIGURE 1 is a side elevational view of a refrigerator truck provided with the novel floor construction of the instant invention;

FIG. 2 is a cross-sectional view taken substantially along the line 2—2 of FIGURE 1; and FIG. 3 is an enlarged cross-sectional view taken substantially within the circle 3 of FIG. 2.

Referring to FIGURE 1 of the drawings, a van-type body 10 is shown in operative association with a conventional truck 12. The body 10 may be provided with conventional rear opening doors 14 to provide access thereinto.

As best seen in FIGURE 2, the body 10 of the truck 12 comprises a plurality of lateral members 20 that extend between spaced longitudinal members 22 and 24. Opposite side walls 26 and 28 extend into engagement with the longitudinal members 22 and 24 to provide a substantially smooth exterior appearance.

The longitudinal members 22 and 24 are provided with interiorly extending flanges 30 and 32, respectively, for the acceptance of the edge portions 34 and 36 of exterior floor boards 38, the floor boards 38 overlying the transverse members 20 and being supported thereby.

Relatively thick insulating side wall members 40 and 42 extend upwardly from the longitudinal members 22 and 24 to define the interior of the body 10. The side walls 40 and 42 have inner liners 44 and 46, respectively, with generally horizontally extending lower end portions 48 and 50 complementary to a plurality of floor panels 60, 62 and 64.

In accordance with the present invention, the inner panels 44 and 46 of the side walls 40 and 42, and the floor panels 60, 62 and 64 have complementary edge portions to facilitate welding of adjacent members to form a substantially sealed enclosure. While the inner members 44 and 46 of the side walls 40 and 42 and floor boards 60, 62 and 64 vary in cross-sectional configuration, it is to be understood that the complementary edge portions thereof are similar in construction so as to provide for welding thereof.

Referring now to FIG. 3 of the drawings, the juncture between the floor boards 60 and 62, which is exemplary of the juncture between the aforementioned inner skin panels 44 and 46 and floor boards 60, 62 and 64, is shown in detail. The floor board 60 has an edge portion 80 that is spaced upwardly from a lower edge face 82 thereof by an upwardly extending flange 84. An upwardly extending flange 86 is disposed between the flange 84 and a terminal edge portion 88 of the floor board 60 for abutting engagement with a complementary upstanding flange 90 on the floor board 62.

The floor board 62 has an edge portion 100 with an upstanding flange 102 thereon that spaces a terminal edge portion 104 upwardly from a lower edge face 106 of the floor board 62. The height of the flange 102 is such that the terminal edge 104 of the plank 62 engages and supports the underside or lower surface 108 of the edge portion 80 of the plank 60.

The edge portion 100 is provided with an upstanding flange 110, spaced inwardly from the flange 102 having a horizontally extending portion 112. The aforementioned flange 90 extends upwardly from the horizontal portion 112 of the flange 110 for engagement with the upstanding flange 86 on the edge portion 80 of the floor board 60. It is to be noted that the horizontal flange 112 overlies the terminal edge portion 88 of the plank 60. Therefore, because the edge portion 88 is supported in a recess 114 defined by the horizontal portion 112 of the flange 110 and an angularly downwardly extending portion 116 of the edge 100, the abutting flanges 86 and 90 are rigidly supported in a manner that not only provides for an excellent weld, but also precludes subsequent cracking of the weld due to flexure of the welded edge portions 80 and 100 of the planks 60 and 62.

It is also to be noted that the edge portions 100 of the plank 62 are secured to the underlying material as by a screw 120, the floor boards 60 and 62 being retained against movement by a holding means that does not extend into the welded enclosure. Also, the boards 60, 62 and 64 may be provided with upstanding generally T-shaped portions 130 to provide a substantially planar upper surface for the floor construction.

From the foregoing description, it should be apparent that the abutting flanges 86 and 90 may be used to guide a welding machine (not shown) for high-speed welding. Also, because of the orientation and configuration of the flanges 86 and 90, such welding can be accomplished by "burning" down of the upstanding tips of the abutting flanges 86 and 90. Thus, the practice of the present invention not only reduces the cost of the welding process by eliminating the need for a filler material, but also produces a weld that is relatively less susceptible to flaws, leaks and operational failure.

It is to be understood that the specific construction of the improved floor construction for trucks, trailers and the like herein disclosed and described is presented for the purpose of explanation and illustration and is not intended to indicate limits of the invention, the scope of which is defined by the following claim.

What is claimed is:

A floor construction for trucks, trailers and the like having a floor supporting structure, said floor construction comprising a plurality of elongated extruded aluminum planks, each of said planks having a plurality of longitudinally extending laterally spaced upstanding generally T-shaped portions, the uppermost surfaces of said T-shaped portions being coplanar and defining a load supporting surface, each of said planks having one horizontal longitudinally extending edge portion disposed intermediate the lowermost portion of said plank and the load supporting surface thereof, said one edge portion having a vertically upwardly extending flange spaced inwardly from the lateral extremity thereof defining a weld tip, the other longitudinal edge portion of each of said planks having a first horizontal flange extending under and engaged with both the supporting structure of said truck and with the horizontal flange on the one edge portion of an adjacent plank for the mechanical support thereof, the other edge portion of said plank having a second horizontal flange extending over the horizontal flange on said one edge portion with a vertically extending flange thereon defining a weld tip disposed in juxtaposed horizontally aligned relationship to the vertical flange on the one edge portion of the adjacent plank, the uppermost surfaces of said weld tips being coextensive and of substantially equal transverse cross sectional area and exposed to facilitate welding of said tips to one another, said tips being welded together to form a substantially sealed unitary floor, said weld being disposed between selected T-shaped sections below the load supporting surface thereof, and a fastener extending through the first flange of the other edge portion of said plank for securing said plank to the supporting structure of said truck.

References Cited by the Examiner

UNITED STATES PATENTS

| | | | |
|---|---|---|---|
| 2,553,922 | 5/1951 | Koontz | 189—34 |
| 2,786,556 | 3/1957 | Constance | 189—34 |
| 2,926,928 | 3/1960 | Bennett | 189—34 X |
| 2,952,341 | 9/1960 | Weiler | 189—34 |
| 3,082,315 | 3/1963 | Johnson | 189—34 |
| 3,092,220 | 6/1963 | Black | 189—34 |

HARRISON R. MOSELEY, *Primary Examiner.*

JOEL REZNEK, REINALDO MACHADO, *Examiners.*